(12) United States Patent
Sakata et al.

(10) Patent No.: US 6,288,888 B1
(45) Date of Patent: Sep. 11, 2001

(54) ELECTRIC DOUBLE LAYER CAPACITOR

(75) Inventors: Koji Sakata; Gaku Harada; Kazuya Mimura; Yutaka Nakazawa, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/467,383

(22) Filed: Dec. 21, 1999

(30) Foreign Application Priority Data

Dec. 25, 1998 (JP) .................................................... 10-369720

(51) Int. Cl.⁷ ...................................................... H01G 9/04
(52) U.S. Cl. ............................................. 361/502; 361/508
(58) Field of Search ..................................... 361/502, 503, 361/508, 516, 512, 509

(56) References Cited

FOREIGN PATENT DOCUMENTS

| 8-55761 | 2/1996 | (JP) . |
| 9-171946 | 6/1997 | (JP) . |

*Primary Examiner*—Anthony Dinkins
(74) *Attorney, Agent, or Firm*—Young & Thompson

(57) ABSTRACT

In an electric double layer capacitor having a pair of polarizable electrodes containing activated carbon and auxiliary materials for giving electric conductivity to the polarizable electrodes, the auxiliary materials include at least two carbon materials such as epitaxially grown carbon fiber and granular graphite. An electric double layer capacitor having small internal resistance, large electrostatic capacitance and small variations of internal resistance and capacitance is realized by the auxiliary materials.

19 Claims, 2 Drawing Sheets

ELECTRIC DOUBLE LAYER CAPACITOR

BACKGROUND OF THE INVENTION

1. Field of the Invention

The present invention relates to an electric double layer capacitor and, particularly, to constituents of a polarizable electrode of an electric double layer capacitor.

2. Description of the Prior Art

Recently, an electric double layer capacitor having high energy density and large power density has been requested as an energy source for driving a motor of such as electric car or an energy recovery system thereof.

In order to improve the power density in response to such request, a method for reducing an internal resistance of the electric double layer capacitor has been proposed. For example, Japanese Patent Application Laid-open No. H8-55761 discloses an electric double layer capacitor having polarizable electrodes constituted mainly with activated carbon having high specific surface and an auxiliary carbon material for giving electric conductivity to activated carbon, which are bound together by a binder such as fluorine containing polymer.

According to the disclosed electric double layer capacitor, the polarizable electrode is constituted with fluorine containing polymer selected from a group consisting of polyvinylidene fluoride, fluoroolefin vinyl ether copolymer and tetrafluoroethylene-propylene copolymer, activated carbon having large specific surface and acetylene black or ketjen black as the auxiliary carbon material.

On the other hand, Japanese Patent Application Laid-open No. H9-171946 discloses an electrode of an electric double layer capacitor using a material prepared by mixing epitaxially grown carbon fiber and resin and carbonating the mixture by heating it and a method for manufacturing the same electrode.

However, these prior arts have problems which are described below.

First, in the case of the electric double layer capacitor disclosed in Japanese Application Laid-open No. H8-55761, the reduction of internal resistance is not enough. The reason for this is that, since particle size of acetylene black or ketjen black is substantially smaller than that of activated carbon, only acetylene black or ketjen black agglomerate to form secondary particles, resulting in insufficient reduction of contact resistance between particles.

Second, electrostatic capacitance of the electric double layer capacitor disclosed in Japanese Patent Application Laid-open No. H9-171946 is small. The reason for this is that, since the carbonated material is used as the polarizable electrode without invigoration thereof, a surface area thereof, which can be utilized as the polarizable electrode, is small.

Third, even if the carbonated material of the polarizable electrode is invigorated in the electric double layer capacitor disclosed in Japanese Patent Application Laid-open No. H9-171946, the electrostatic capacitance and the internal resistance of the electric double layer capacitors manufactured by the described method are substantially varied. The reason for this is that, when the carbonated material is invigorated, the rigidity of the polarizable electrode is reduced and it becomes impossible to maintain a predetermined configuration of the electrode to thereby precisely put a necessary amount of polarizable electrode material in the electric double layer capacitor. Particularly, this phenomenon tends to be more actualized when the polarizable electrode is made thinner. It is necessarily possible to maintain the predetermined configuration of the electrode if the degree of invigoration is weak. However, since an enough surface area of the electrode can not given as mentioned previously, the electrostatic capacitance of the capacitor becomes small.

SUMMARY OF THE INVENTION

The present invention was made in view of the state of the art and an object of the present invention is to provide an electric double layer capacitor, which has a small internal resistance, a large electrostatic capacitance and small variations of the internal resistance and the electrostatic capacitance.

According to the present invention, an electric double layer capacitor has polarizable electrodes formed of a mixture of activated carbon and at least two auxiliary carbon materials for giving electric conductivity to the polarizable electrodes.

At least one of the auxiliary carbon materials for giving electric conductivity is a carbon material and, preferably, epitaxially grown carbon fiber or granular graphite.

A mass of the auxiliary carbon materials is not smaller than 3% and not larger than 20% of a mass of the whole polarizable electrode.

It is preferable that the auxiliary carbon materials are epitaxially grown carbon fiber and granular graphite and mixed in the polarizable electrode at a mixing ratio of the epitaxially grown carbon fiber being ½ to 2 with respect to the granular graphite.

Further, the polarizable electrode is featured by containing fluorine containing polymer such as polyvinylidene fluoride and thickness of the polarizable electrode is preferably 200 μm or less. Further, according to the present invention, it is possible to realize a polarizable electrode having an electric double layer capacitance, formed in an interface between aqueous solution of sulfuric acid and the polarizable electrode, of 15F or more per unit volume.

Particularly, according to the present invention, the polarizable electrode contains activated carbon having average particle size in a range from 3 μm to 30 μm and two auxiliary carbon materials. The auxiliary carbon materials are epitaxially grown carbon fiber having diameter in a range from 1 μm to 10 μm and length in a range from 20 μm to 100 μm and granular graphite having average particle size in a range from 3 μm to 10 μm. That is, the internal resistance of the electric double layer capacitor according to the present invention is reduced by dispersing epitaxially grown carbon fiber having the specific configuration and size and granular graphite in the activated carbon.

DETAILED DESCRIPTION OF THE PREFERRED EMBODIMENTS

Figure 1:
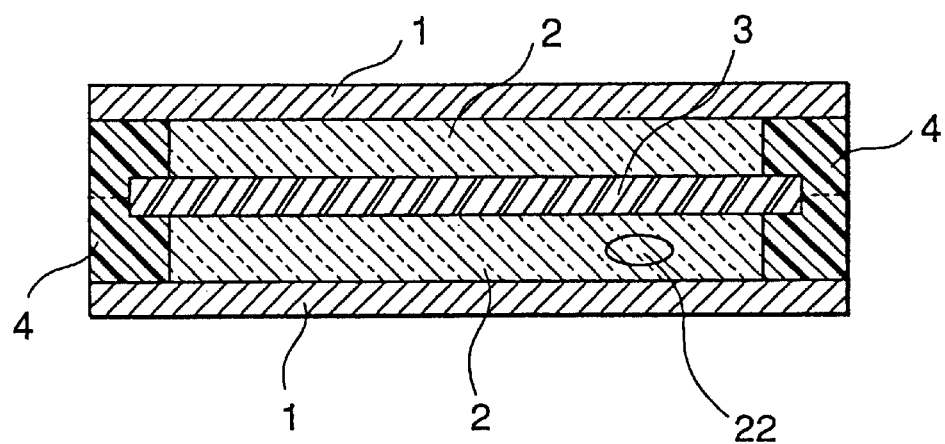
FIG. 1 is an illustrative cross section of an electric double layer capacitor according to an embodiment of the present invention.

Referring to FIG. 1, an electric double layer capacitor 100 according to an embodiment of the present invention is constructed with a pair of polarizing electrodes 2 arranged in an opposing relation through a separator 3 containing electrolyte liquid, collectors 1 and a gasket 4 arranged peripherally of the polarizable electrodes. The constitutional components of the electric double layer capacitor 100 other than the polarizable electrodes 2, that is, the electrolyte liquid, the separator 3, the collectors 1 and the gasket 4 are those well known in the art and do not define the present invention.

The construction of the polarizable electrode 2 will be described in detail with reference to FIG. 2 which is an enlarged cross section showing a portion 22 of the polarizable electrode 2 of the present invention. The polarizable electrode 2 is constituted with activated carbon powder 5, epitaxially grown carbon fiber 7, granular graphite 6 and a binder 8. The activated carbon powder 5 has high specific surface area in a range from 1000 $m^2/g$ to 3000 $m^2/g$ (BET method) and average particle size in a range from 3 $\mu m$ to 30 $\mu m$. The epitaxially grown carbon fiber 7 as one of two auxiliary carbon materials has a configuration having diameter in a range from 1 $\mu m$ to 10 $\mu m$ and length in a range from 20 $\mu m$ to 100 $\mu m$ and the granular graphite 6 as the other auxiliary carbon material has average particle size in a range from 3 $\mu m$ to 10 $\mu m$. The epitaxially grown carbon fiber 7 and the granular graphite 6 are contained in the polarizable electrode 2 at a rate in a range from 3% to 20% of the polarizable electrode 2 and a ratio of the epitaxially grown carbon fiber to the granular graphite is in a range from ½ to 2. The binder 8 is used to bind these carbon materials.

Since electric conductivity of the epitaxially grown carbon fiber is high, electric conductivity of the polarizable electrode obtained by mixing the epitaxially grown carbon fiber and the activated carbon is high correspondingly. Particularly, it is effective in order to improve the conductivity of the polarizable electrode to mix epitaxially grown carbon fiber having length in a specific range from 20 $\mu m$ to 100 $\mu m$ with activated carbon having average particle size in a range from 3 $\mu m$ to 30 $\mu m$. More preferably, the length of the epitaxially grown carbon fiber is in a range from 40 $\mu m$ to 60 $\mu m$ and the optimum value of the fiber length is about 50 $\mu m$. A more preferable diameter of the epitaxially grown carbon fiber is in a range from 1 $\mu m$ to 3 $\mu m$ and the optimal value of the diameter is about 1 $\mu m$.

With the above mentioned values of the epitaxially grown carbon fiber and the activated carbon, it is believed that the structural balance between them becomes optimal. That is, the epitaxially grown carbon fiber is fibrous carbon material and takes in the form of three-dimensional mesh structure in which fibers are partially tangled, while the activated carbon used in this invention takes in the form of powder having average particle size in the range from 3 $\mu m$ to 30 $\mu m$. The average particle size of the activated carbon is more preferably from 10 $\mu m$ to 20 $\mu m$ and the optimal value of the particle size is about 17 $\mu m$.

It is considered that, in a case where the length of the epitaxially grown carbon fiber in the mixture is 20 $\mu m$ or less, activated carbon can not enter into the three-dimensional mesh structure since the mesh of the epitaxially grown carbon fiber is small with respect to the diameter of the activated carbon and activated carbon particles are agglomerated in the electrode, so that the contact interface therebetween is increased, preventing the conductivity of the mixture from being increased sufficiently. On the other hand, when the length of the epitaxially grown carbon fiber is 100 $\mu m$ or more, it is considered that activated carbon particles agglomerate in the three-dimensional mesh structure since the mesh of the epitaxially grown carbon fiber is too long with respect to the particle size of the activated carbon, so that the contact interface is increased, preventing the electric conductivity of the mixture from being increased sufficiently. Therefore, it is considered, in order to obtain the most preferable electric conductivity, to control the length of epitaxially grown carbon fiber and the size of the activated carbon particle within certain specific ranges, respectively.

Now, the improvement of electric conductivity of the polarizable electrode, which is realized by mixing the epitaxially grown carbon fiber having the described size and the granular graphite having the described size at the specific ratio, will be described.

Table 1 shows a relation between amounts of the activated carbon, the epitaxially grown carbon fiber, the granular graphite and the binder, in percentage, the ratio of the epitaxially grown carbon fiber to the granular graphite and the specific resistance of the resultant polarizable electrode.

TABLE 1

| binder (%) | activated carbon (%) | auxiliary carbon materials (%) | ratio of auxiliary carbon materials (epitaxially grown carbon fiber/granular graphite) | specific resistance ($\Omega \cdot cm$) |
|---|---|---|---|---|
| 10 | 90 | 0 | 0 | 50.5 |
| 10 | 80 | 10 | 1/3 | 15.5 |
| 10 | 80 | 10 | 1/2 | 5.0 |
| 10 | 80 | 10 | 1 | 1.5 |
| 10 | 80 | 10 | 2 | 3.2 |
| 10 | 80 | 10 | 3 | 9.3 |

Referring to Table 1, it is clear that the electric conductivity of the polarizable electrode is improved by mixing the epitaxially grown carbon fiber and the granular graphite in the polarizable electrode.

Furthermore, it is also clear that there is an optimal range of the mixing ratio of the epitaxially grown carbon fiber to the granular graphite and the optimal range is from ½ to 2. That is, the specific resistance can be reduced to about one tenth of the specific resistance of 50.5 $\Omega \cdot cm$ in the case where there is no auxiliary carbon materials are mixed, by mixing the epitaxially grown carbon fiber and the granular graphite at the rate in the above mentioned range, which can not be achieved by the prior art.

The reason for the existence of the optimal range of the mixing ratio may be that, when the ratio of the epitaxially grown carbon fiber to the granular graphite is smaller than ½, the contact resistance due to contact of particles of the dominant granular graphite attributes to the reduction of the internal resistance of the polarizable electrode adversely and, when the ratio of the epitaxially grown carbon fiber to the granular graphite exceeds 2, the effect of the addition of granular graphite, that is, the reducing effect of the internal resistance due to the increase of the contact area between epitaxially grown carbon fiber, activated carbon and granular graphite is reduced.

The average particle size of granular graphite used in the present invention is defined in a range from 3 $\mu m$ to 10 $\mu m$. The reason for this may be that the contact area of high electric conductivity materials is increased by mixing carbon materials having particle size smaller than that of activated carbon thereto, causing the electric conductivity of the polarizable electrode to be increased. More preferably, the average particle size of granular graphite is in a range from 4 $\mu m$ to 6 $\mu m$ and the optimal average particle size is about 5 $\mu m$.

As described, it is possible to reduce the internal resistance of the polarizable electrode by increasing the electric conductivity of the polarizable electrode.

The present invention does not define the thickness of the polarizable electrode. However, the present invention is particularly effective in constructing a thin film electrode.

For example, when a thin film polarizable electrode 50 μm thick is manufactured according to the method disclosed in Japanese Patent Application Laid-open No. H9-171946, it is impossible to maintain the configuration of polarizable electrode and a capacitance or internal resistance of a resultant electric double layer capacitor varies substantially.

In the present invention, however, the rigidity of the polarizable electrode is increased by adding the binder to the mixture of the activated carbon and the auxiliary carbon materials at the described ratio and, therefore, it is possible to maintain the predetermined configuration of the polarizable electrode. Consequently, it is possible to solve the problem of variation of capacitance or internal resistance of the polarizable electrode even if the latter takes in the form of thin film.

Further, according to the present invention, the electric double layer capacitance formed in the interface of aqueous solution of sulfuric acid and the polarizable electrodes of 15F or more for unit volume is obtained by using polyvinylidene fluoride as the binder. This is because the reduction of surface area due to the auxiliary carbon materials and polyvinylidene fluoride surrounding the activated carbon material having high specific surface area is small.

First Embodiment

Figure 2:
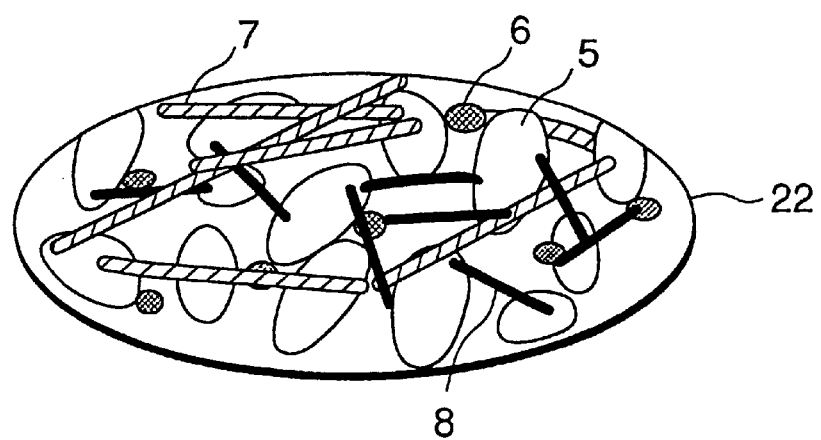
FIG. 2 is an enlarged cross section of a polarizable electrode of the electric double layer capacitor shown in FIG. 1.

As shown in FIGS. 1 and 2, the electric double layer capacitor 100 according to the present invention is constructed with aqueous solution of sulfuric acid as an electrolyte, a pair of polarizable electrodes 2 arranged in an opposing relation through a 30 μm thick, separator 3 of mainly polypropylene resin, collectors 1 of electrically conductive butyl rubber and a gasket 4 of insulating butyl rubber surrounding the polarizable electrodes. The polarizable electrode 2 is 100 μm thick and has a 3 cm×3 cm area. The polarizable electrode 2 is composed of activated carbon powder 5, epitaxially grown carbon fiber 7 as one of the auxiliary carbon materials, granular graphite 6 as the other auxiliary carbon material and binder 8 of polyvinyl alcohol, etc.

In FIG. 2, the activated carbon powder 5 has high specific surface area of 1500 m²/g (BET method) and an average particle size thereof is 15 μm. The epitaxially grown carbon fiber 7 is fibrous carbon having diameter in a range from 1 μm to 10 μm and length in a range from 20 μm to 100 μm and an average particle size of the granular graphite 6 is 5 μm. These auxiliary carbon materials are 5% of the polarizable electrode. The ratio of the epitaxially grown carbon fiber 7 to the granular graphite 6 is 1. The binder 8 of polyvinyl alcohol is 20% of the polarizable electrode.

The electric double layer capacitor 100 according to this embodiment can be manufactured by a combination of known techniques. That is, as a first step, the constituents of the polarizable electrode 2, that is, the activated carbon powder 5, the epitaxially grown carbon fiber 7, the granular graphite 6 and the binder 8, are mixed together at the predetermined ratio with a solvent. Then, as a second step, the mixture of the polarizable electrode materials is put in a predetermined pattern on the collectors 1 by printing to form a pair of the polarizable electrodes 2 on the respective collectors 1. Then, as a third step, aqueous solution of sulfuric acid is injected into the polarizable electrodes 2 and the separator 3. Finally, the gasket 4 of insulating butyl rubber surrounding the polarizable electrodes 2 is disposed on an outer peripheral portion and the polarizable electrodes 2 on the collectors 1 are lain one on the other through the separator 3 as shown in FIG. 1. Then, the a boarder surface between the collectors 1 and the gasket 4 is sealed by vulcanizing reaction of the butyl rubber by heating the structure at 120° C. for 5 hours.

Table 2 shows the maximum values, the average values and the minimum values of the internal resistances and the capacitances of 10 electric double layer capacitors 100 each manufactured through the above mentioned steps. Table 2 also contains those values of 10 electric double layer capacitors manufactured according to a second embodiment as well as a third embodiments to be described below and those of a comparative example to be described below.

| Electric Characteristics of Electric Double Layer Capacitors | | | | | | |
| --- | --- | --- | --- | --- | --- | --- |
| | internal resistance (mΩ) | | | capacitance (F) | | |
| | max. | average | min. | max. | average | min. |
| embodiment 1 | 18 | 17 | 14 | 2.98 | 2.54 | 2.18 |
| embodiment 2 | 11 | 9 | 7 | 3.66 | 2.84 | 2.42 |
| embodiment 3 | 10 | 8 | 6 | 3.38 | 2.70 | 2.22 |
| comparative example | 198 | 150 | 135 | 3.76 | 2.70 | 2.40 |

It will be clear from Table 2 that internal resistances of the present electric double layer capacitors are sufficiently reduced compared with the conventional electric double layer capacitor.

Furthermore, the rigidity of the polarizable electrode is improved by the addition of the binder 8, so that it is possible to maintain the configuration thereof.

Second Embodiment

The second embodiment differs from the first embodiment in that the binder 8 is of polyvinylidene fluoride in lieu of polyvinyl alcohol. The amount of polyvinylidene fluoride is the same as that of polyvinyl alcohol used in the first embodiment. The maximum values, the average values and the minimum values of the internal resistances and the capacitances of 10 electric double layer capacitors 100 each manufactured through the above mentioned steps of the second embodiment are also shown in Table 2. From Table 2, it will be clear that the performance of the electric double layer capacitor according to the second embodiment is superior compared with the conventional capacitor as in the case of the first embodiment.

The capacitance of the electric double layer capacitor according to the second embodiment, converted into that for unit volume of the polarizable electrode, exceeds 15F and a large capacitance is realized together with the reduction of internal resistance.

Third Embodiment

The third embodiment differs from the second embodiment in that the mixing ratio of the epitaxially grown carbon fiber 7 to the granular graphite 6 is 2.

The maximum values, the average values and the minimum values of the internal resistances and the capacitances of 10 electric double layer capacitors 100 each manufactured through the above mentioned steps of the third embodiment are also shown in Table 2. From Table 2, it will be clear that the performance of the electric double layer capacitor according to the third embodiment is superior compared with the conventional capacitor as in the case of the first embodiment.

Comparative Example

Figure 3:
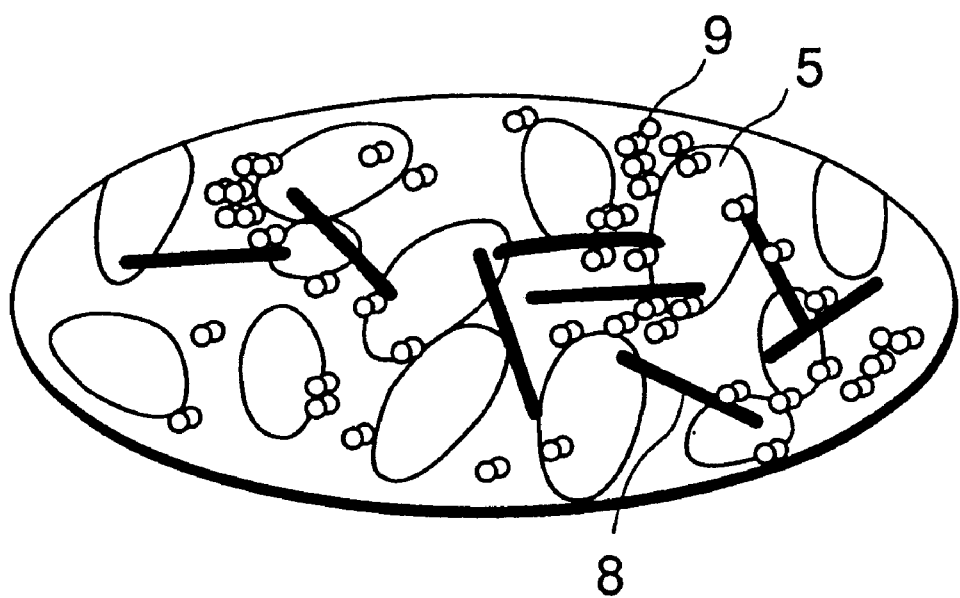
FIG. 3 is an enlarged cross section of a polarizable electrode of a comparative electric double layer capacitor.

FIG. 3 is an enlarged cross sectional view of a polarizable electrode of a conventional electric double layer capacitor 100. In FIG. 3, the polarizable electrode 2 is constituted with activated carbon powder 5, ketjen black 9 and binder 8 of polyvinylidene fluoride, which are disclosed in Japanese Patent Application Laid-open No. H8-55761. The activated carbon powder 5, the ketjen black 9 and the binder 8 are mixed together at a ratio of 70wt %, 10wt % and 20wt %, respectively.

Similarly to the first to third embodiments of the present invention, the maximum values, the average values and the minimum values of the internal resistances and the capacitances of 10 electric double layer capacitors 100 each manufactured through the above mentioned steps of the comparative example are shown in Table 2.

The present invention is, of course, not limited to the above mentioned embodiments and can be applied to other embodiments as well.

Furthermore, the number of the constitutional members, positions thereof and configurations thereof of the electric double layer capacitor are not limited to those of the described embodiments.

As described hereinbefore, the present invention provides the following advantages.

The first advantage is that the internal resistance of the electric double layer capacitor can be substantially reduced compared with the conventional electric double layer capacitor. As mentioned previously, this advantage results from the increase of the conductivity of the polarizable electrodes, which is obtained by adding the auxiliary carbon materials, which have the specific configurations, give electric conductivity to the polarizable electrodes and are mixed together at the specific ratio, to the polarizable electrodes at the mixing ratio thereof to the whole polarizable electrodes within the suitable range.

The second advantage is that the variations of the internal resistance and capacitor of the electric double layer capacitors are removed. Thus advantage results from the fact that it becomes possible to maintain the electrode configuration for a long period of time even when the electric double layer capacitor is as thin as 100 $\mu$m, by using fluorine containing polymer as the binder.

The third advantage is that the capacitance of the electric double layer capacitor is substantially increased. This advantage results from that it becomes possible to maintain the electrode configuration for a long period of time by using polyvinylidene fluoride as the binder.

What is claimed is:

1. An electric double layer capacitor comprising a pair of polarizable electrodes containing activated carbon and at least two auxiliary materials for giving electric conductivity to said polarizable electrodes.

2. An electric double layer capacitor as claimed in claim 1, wherein one of said auxiliary materials is a carbon material.

3. An electric double layer capacitor as claimed in claim 1, wherein said auxiliary materials are carbon materials.

4. An electric double layer capacitor as claimed in claim 1, wherein one of said auxiliary materials is epitaxially grown carbon fiber.

5. An electric double layer capacitor as claimed in claim 4, wherein said epitaxially grown carbon fiber has a diameter in a range from 1 $\mu$m to 10 $\mu$m.

6. An electric double layer capacitor as claimed in claim 5, wherein said epitaxially grown carbon fiber has a length in a range from 20 $\mu$m to 100 $\mu$m.

7. An electric double layer capacitor as claimed in claim 1, wherein one of said auxiliary materials is granular graphite.

8. An electric double layer capacitor as claimed in claim 7, wherein said granular graphite has an average particle size in a range from 3 $\mu$m to 10 $\mu$m.

9. An electric double layer capacitor as claimed in claim 5, wherein said activated carbon has an average particle size in a range from 3 $\mu$m to 30 $\mu$m.

10. An electric double layer capacitor as claimed in claim 1, wherein a mass of said auxiliary materials is in a range from 3% to 20% of a mass of said polarizable electrodes.

11. An electric double layer capacitor as claimed in claim 5, wherein said epitaxially grown carbon fiber is mixed in said polarizable electrodes at a rate in a range from ½ to 2 with respect to said granular graphite.

12. An electric double layer capacitor as claimed in claim 1, wherein said polarizable electrodes further contain a fluorine containing polymer.

13. An electric double layer capacitor as claimed in claim 12, wherein said fluorine containing polymer is polyvinylidene fluoride.

14. An electric double layer capacitor as claimed in claim 1, wherein the thickness of each of said polarizable electrodes is 200 $\mu$m or less.

15. An electric double layer capacitor as claimed in claim 1, wherein a capacitance per unit volume of an electric double layer formed in an interface between aqueous solution of sulfuric acid and said polarizable electrodes is 15F or more.

16. An electric double layer capacitor as claimed in claim 4, wherein one of said auxiliary materials is epitaxially grown carbon fiber and the other is granular graphite.

17. An electric double layer capacitor as claimed in claim 16, wherein said epitaxially grown carbon fiber is mixed in said polarizable electrodes at a rate in a range from ½ to 2 with respect to said granular graphite.

18. An electric double layer capacitor as claimed in claim 17, wherein said epitaxially grown carbon fiber has a diameter in a range from 1 $\mu$m to 10 $\mu$m and a length in a range from 20 $\mu$m to 100 $\mu$m and said granular graphite has an average particle size in a range from 3 $\mu$m to 10 $\mu$m.

19. An electric double layer capacitor as claimed in claim 18, wherein said activated carbon has an average particle size in a range from 3 $\mu$m to 30 $\mu$m and said polarizable electrodes further contain a fluorine containing polymer.

* * * * *